Jan. 25, 1966   G. S. LORING   3,231,073
APPARATUS FOR ACTUATING LIFTING OF LINECASTING
MACHINE ASSEMBLY ELEVATOR
Filed Oct. 27, 1964   5 Sheets-Sheet 3

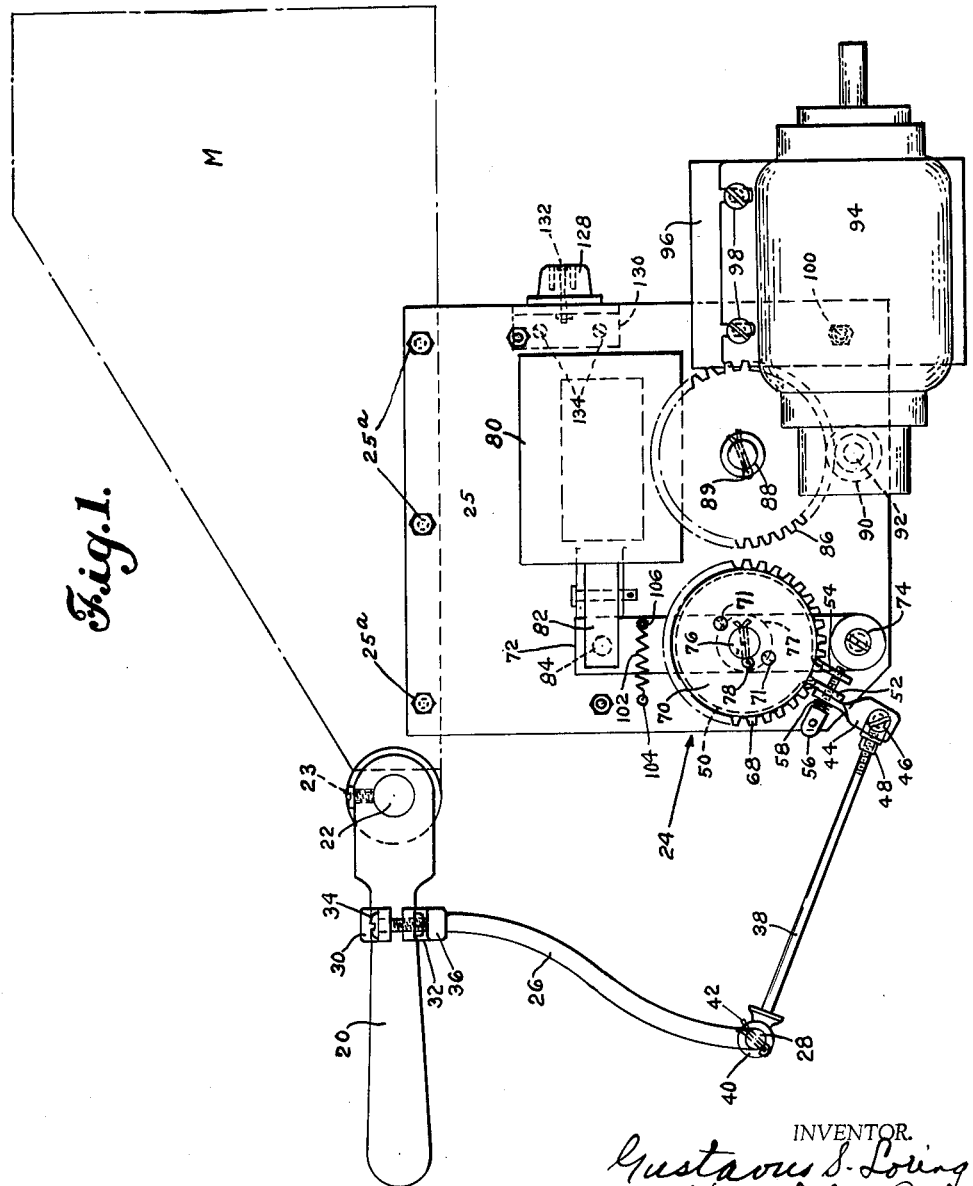

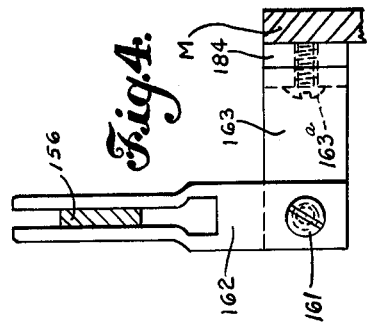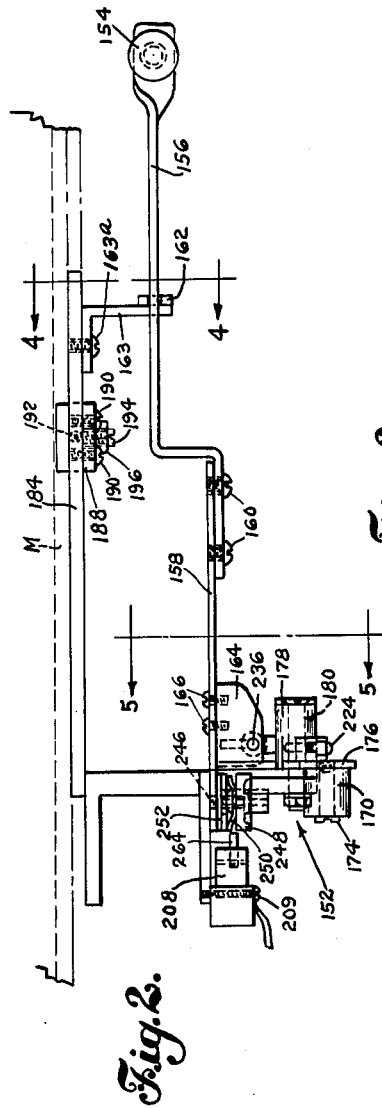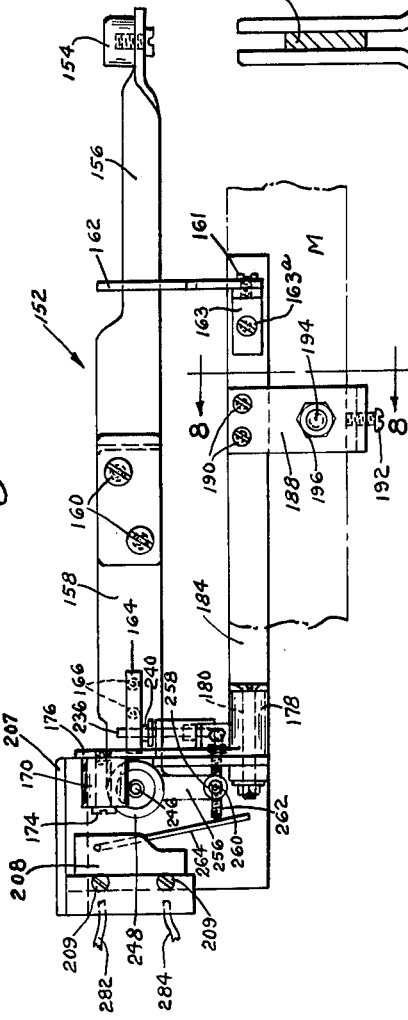

INVENTOR.
Gustavus S. Loring
BY Harold E. Cole
Attorney

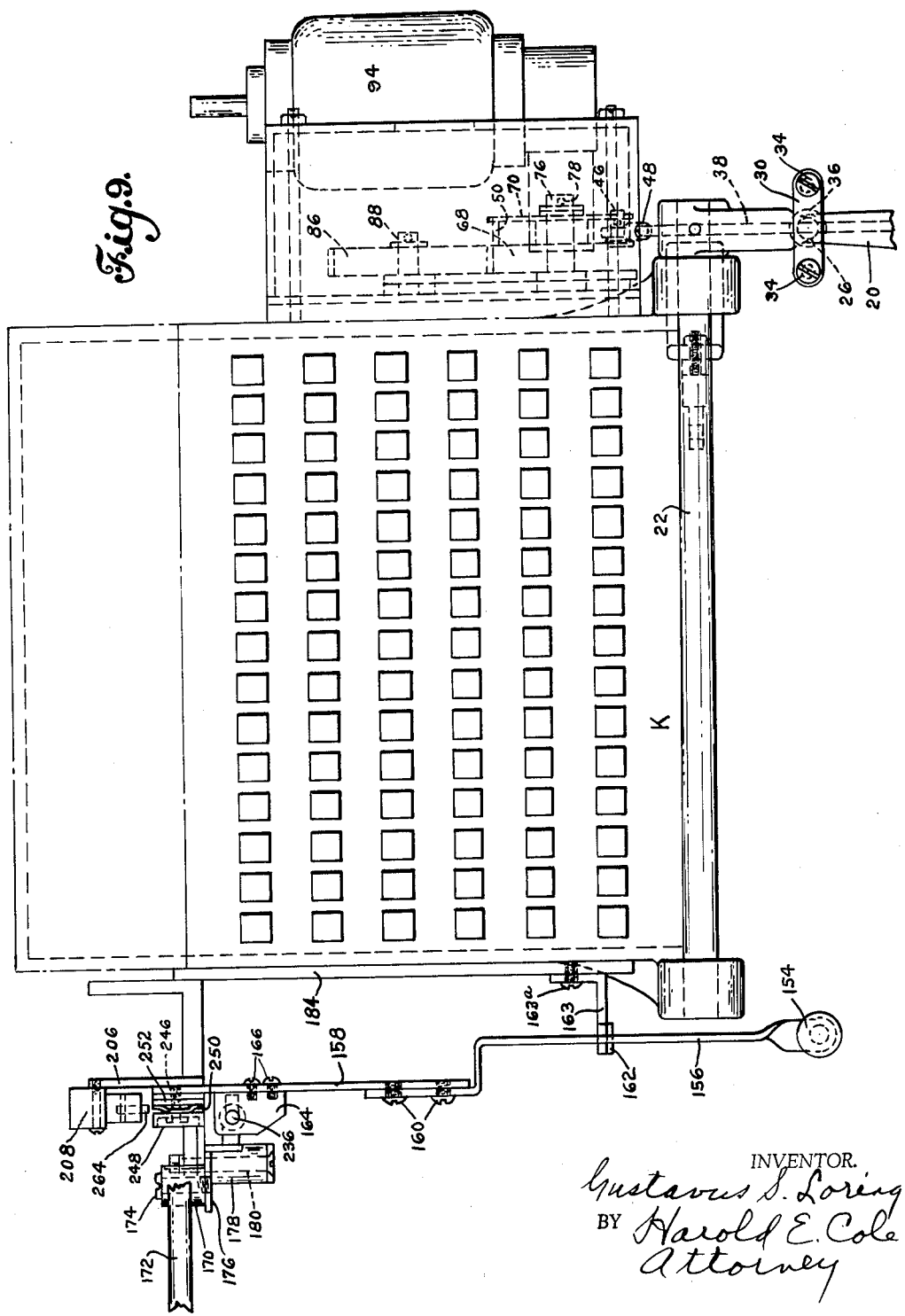

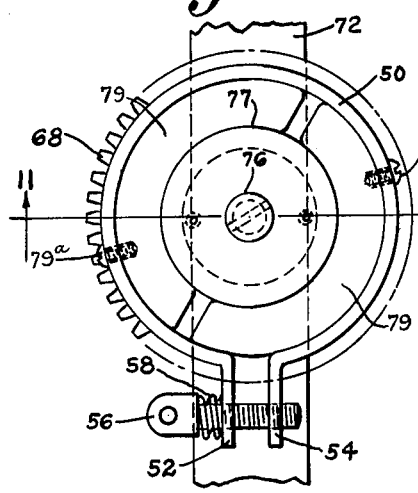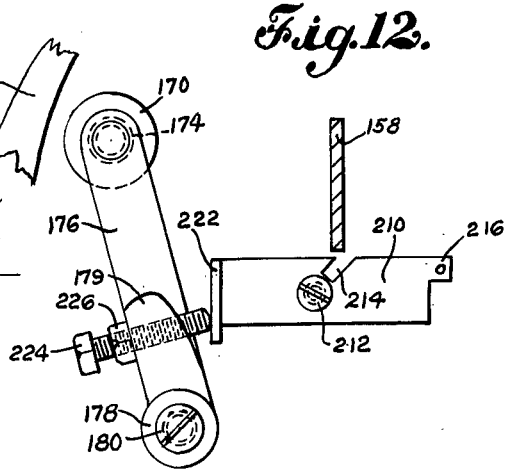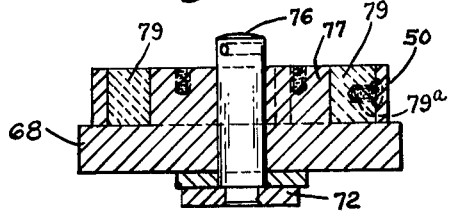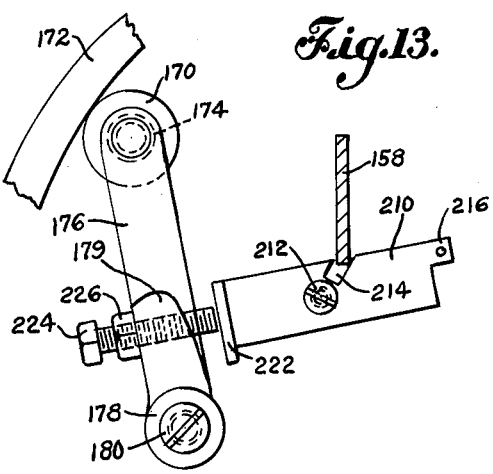

United States Patent Office 3,231,073
Patented Jan. 25, 1966

3,231,073
APPARATUS FOR ACTUATING LIFTING OF LINE-CASTING MACHINE ASSEMBLY ELEVATOR
Gustavus S. Loring, Belmont, Mass., assignor to Craftsmen Machinery Co., Boston, Mass., a corporation of Massachusetts
Filed Oct. 27, 1964, Ser. No. 406,731
4 Claims. (Cl. 199—18)

This invention relates to apparatus to actuate the assembling elevator lifting mechanism of a linecasting machine.

One object of my invention is to provide such apparatus that can be operatively connected to a well-known linecasting machine without changing any parts of, or substituting new parts for, said machine.

Another object is to provide apparatus that, by merely pressing a finger key, an electrical circuit is established, thus activating lever actuating means and thereby operating the lifting mechanism of the assembling elevator of a linecasting machine. This eliminates the hand labor ordinarily required to raise said lifting mechanism by repeatedly pressing down upon the handle thereof, speeds the operation of said machine, and enables the operator to keep his hands continually over the keys.

Still another object is to provide such apparatus that can be operatively attached to a linecasting machine; but which permits the later to be operated manually in the normal way should my apparatus get out of order.

A further object is to provide stop mechanism whereby my apparatus cannot become operative unless the linecasting machine is in normal position ready for the lifting operation.

A still further object is to provide such apparatus that is relatively simple to manufacture and can readily be attached to a linecasting machine by unskilled workmen, all ready to use.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

FIG. 1 is a right side elevational view showing part of my apparatus attached to a linecasting machine.

FIG. 2 is a top plan view, looking down at the left side of a linecasting machine, showing another part of my apparatus.

FIG. 3 is a side elevational view of the apparatus shown in FIG. 2, in normal position.

FIG. 4 is an enlarged, sectional view taken on the line 4—4 of FIG. 2.

FIG. 9 is a top plan view showing my apparatus connected to a linecasting machine.

FIG. 10 is an enlarged, top plan view showing the driven gear and clutch assembly at the right side of my apparatus, the cover for it having been removed.

FIG. 11 is a sectional view taken on the line 11—11 of FIG. 10.

FIG. 12 is an enlarged, side elevational view showing a detent stop member and actuating parts therefor in normal position.

FIG. 13 is a view similar to FIG. 12; but showing the detent stop member and actuating parts therefor in actuated position.

Figure 5:
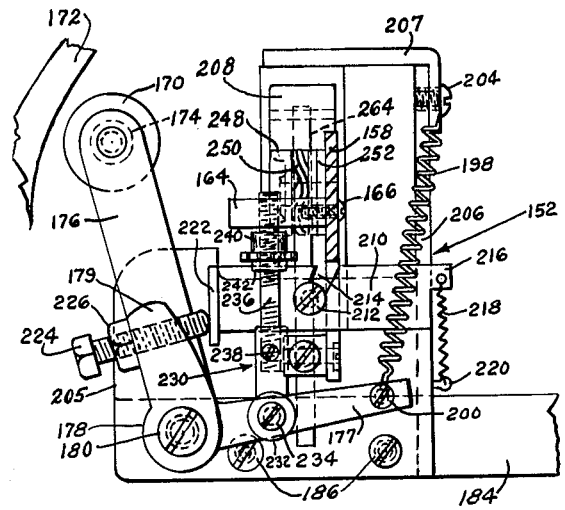
FIG. 5 is an enlarged, sectional view taken on the line 5—5 of FIG. 2.
Figure 8:
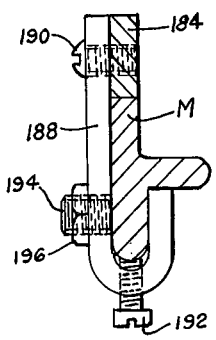
FIG. 8 is an enlarged, sectional view taken on the line 8—8 of FIG. 3.
Figure 6:
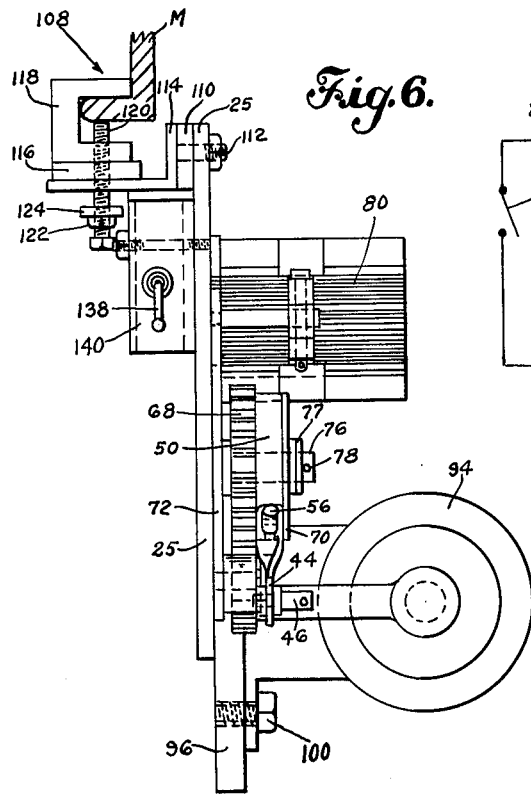
FIG. 6 is a front elevational view taken at the right side of a linecasting machine showing part of my apparatus but omitting lifting mechanism and lever actuating means connected to the latter.

As illustrated, a linecasting machine is indicated as M. It has the usual lifting mechanism, commonly operated by hand or manually, of a matrix assembly elevator. Normally upon pressing the usual handle 20 the usual shaft 22 connected thereto is actuated thereby raising the well-known lifting mechanism. The latter is not shown beyond the shaft 22 since it is well-known and is standard equipment on a linecasting machine. A screw 23 holds said shaft 22 to said handle 20.

In substitution of said hand operation I provide my apparatus which can be connected to said lifting mechanism without modifying the latter. My apparatus has a mounting plate 25 attached to said machine M by screws 25a.

Lever actuating means 24 operatively connects to lever means having a pull arm 26 with an offset portion 28 at its lower end. A split clamp has an upper portion 30 and a lower portion 32 which are attached to said handle 20 by a screw 34. On said lower portion 32 is a boss 36 with which said arm 26 screw-threadedly connects. A link 38 connects with said pull arm 26 by means of a head 40 at one end thereof. Said arm and link have openings through which said offset portion 28 passes, and the connection is retained by a cotter pin 42.

A clutch has an arm 44 connected to link 38 by means of a stud 46 passing through it and into a turnbuckle 48 connected to said link. A clutch band 50 is desirable to give finer control over responsive movement of said lifting mechanism. It has two ears 52 and 54, the latter being internally screw-threaded to connect with a screw-threaded stud 56 that serves to hold said clutch band 50 as tight as desired with the aid of a compression coil spring 58 that bears on said arm 44 and stud 56.

Outside a driven gear 68 is a cover plate 70 that is held by screws 71 to a hub portion 77 of said gear. A pivoting, supporting bar 72 serves as a mount for said gear 68 and clutch 50, being held by a screw-threaded stud 74 extending through bar 72 and screw-threadedly connecting with said mounting plate 25. Another stud 76 rotatably supports said gear 68 which latter has a hub portion 77. A cotter pin 78 extends through stud 76 to retain said gear thereon. Arcuate friction pieces or facings 79 next to said clutch band 50 are held by screws 79a.

A solenoid 80, having a movable arm 82, is held to said bar 72 by a pin 84 extending through arm 82 and fixed in the latter. A motor driven gear 86, which normally rotates continuously and is spaced from gear 68, is rotatably mounted by a stud 88 fixedly set in said plate 25, being held in position by a cotter pin 89. This gear 86 remains in mesh with a pinion 90 on a motor shaft 92 driven by an electric motor 94 that is mounted on a stand 96 by bolts 98. Said stand is fastened to mounting plate 25 by a bolt 100.

A coil spring 102 at one end is attached to a pin 104 fixed in mounting plate 25 and fastened to a pin 106 attached to supporting bar 72 at the other end. This spring 102 assures the return of said gear 68 to normal position, out of mesh with gear 86, when said solenoid 80 is not electrically charged.

My attachment is fastened to a linecasting machine by clamping mechanism 108 having an attaching bar 110 fastened by bolts 112 to said mounting plate 25. An angle member 114 attached, as by welding, to said bar 110, receives a plate 116 to which a U-shaped clamp 118 is attached as by welding. The latter is intended to receive a part of the machine M and a clamping screw 120 passes through said angle member 114, plate 116 and clamp 118 and, when tightened would bear against the machine M. Said screw 120 may be held in the desired position by a check nut 122 thereon next to a washer 124.

My apparatus is supplied with electrical current through an electric plug 128 attached to an angle bracket 130 held by a bolt 132 to the latter. Screws 134 hold said bracket 130 to said mounting plate 25. A switch handle 138 forming part of a switch 140 controls electrical current through said plug 128. If my apparatus becomes inoperative the machine M can be operated manually by pressing on said handle 20 in the usual way.

Electrically connected to said lever actuating means 24, I preferably provide an electrical circuit control means 152 having a lever key 154 which the operator presses when the assembly elevator is to be lifted. A control lever 156 extends from said key 154 and continues in an offset, straight arm portion 158 held by screws 160 to lever 156. A screw 161 extends through a forked guide 162 and enters a bracket 163. Said control lever 156 is movable in said guide 162. Said bracket 163 is fastened by screw 163a that extends into an angle support 184 later described. Another guide 164 is held by screws 166 to connector arm portion 158.

Stop means to delay closing of an electrical circuit has a roller 170 that is adapted to contact the usual line delivery carriage lever 172 of said machine M when the latter lever is in a predetermined position. This roller 170 rotates on a stud 174 that is fixed to a pivot arm 176 having an angular extension 177 and a hub portion 178 at one side. A lug 179 is at one side of said hub 178. A stud 180 extends through said hub 178, a mounting member 205, later described, and an angle support bar 184 supported by said machine M. Screws 186 hold angle bar 184 to mounting member 205, and a U-clamp 188 is screwed at 190 to bar 184. Said U-clamp 188 connects with said machine M.

A clamping screw 194 extends through clamp 188 and is held by a locknut 196 against said machine M. A binding screw 192 also extends through clamp 188 into contact with said machine M. A coil spring 198, under tension, is attached at one end by a screw 200 that enters said arm extension 177, and at the other end of said spring a screw 204 attaches it to an angle portion 206 extending from said mounting member 205. An angle supporting member 207 also receives screw 204. A well-known enclosed contact switch 208 is held by screws 209 to said angle portion 206. This coil spring 198 is under tension, consequently it returns said actuating arm 176 automatically to normal position when said carriage lever 172 no longer contacts said roller 170 and said lever key 154 is released, hence the electrical circuit, later described, to said solenoid 80 will be broken.

A lever stop member shown as a movable detent 210 is pivotally attached as at 212 to said mounting member 205. Said stop member detent 210 has a diagonally extending slot 214 and at one end it has an extension 216 to which one end of a coil spring 218 is connected, the other end being connected to a pin 220 fixed to said mounting member 205 and which serves to return said detent 210 to normal position as shown in said FIG. 12. Said detent has an angular contact member 222.

An adjusting screw 224 screw-threadedly connects with and extends through said pivot arm lug 179 and normally contacts said detent 210. A locknut 226 holds said screw 224 in predetermined position to normally keep said connector arm 158 from entering said slot 214. Pivotal movement of the detent 210 can bring said arm 158 opposite said slot 214 and enables it to enter the latter as shown in said FIG. 13.

Key regulator mechanism 230 has an angular hub 232 attached to said pivot arm extension 177 by a stud 234 that loosely extends through said hub 232 and screw-threadedly connects with said extension 177. A screw-threaded stop rod 236 enters and screw-threadedly connects with said hub 232 and is movable therewith. It movably extends through said guide 164. A screw 238 enters said hub 232 to hold said rod 236 in desired position.

An adjustable thumb nut 240 screw-threadedly connects on said rod 236, being under and in contact with said guide 164. Said nut 240 is held in predetermined position by a locknut 242 on said rod 236. A stud 246 pivotally connects and extends through connector arm 158, through a nut 248, a spring washer 250 on said nut 248, and through a washer 252 that bears on said connector arm 158.

An extension arm 256 extends angularly from said arm 158 and has a hub 258 extending outwardly therefrom. A set screw 260 screw-threadedly connects with said hub 258, passes through it and contacts and holds in set position an adjusting screw 262 that contacts a switch lever 264 forming part of said contact switch 208. When said extension arm 256 is moved to operable position, and said control lever 156 is depressed, said screw 262 forces said switch lever 264 to closed position thus establishing electrical contact by closing contacts, not shown, in said switch 208 in the usual way.

Figure 7:
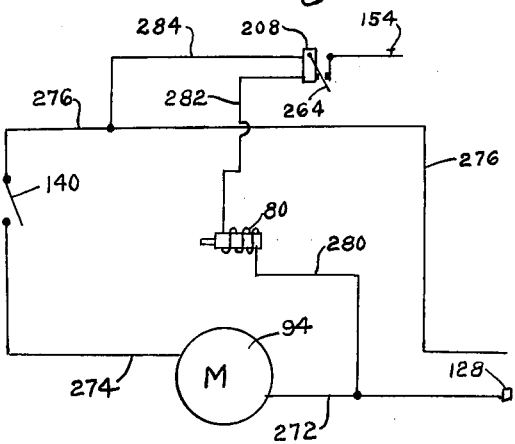
FIG. 7 is an electrical diagram showing an electrical circuit used in the operation of my apparatus.

In FIG. 7 said electrical diagram shows a wire 272 running from said electric plug 128 which latter connects with a source of electrical current. Said wire 272 extends to said motor 94 and then the connection continues by a wire 274 which is controlled by said switch 140. A return line 276 extends from the latter switch to said source. This provides current whereby said gear 86 will be continuously rotated during use of my apparatus.

Another electrical line provides current from outside through a line 280 that connects with said supply line 272 and extends to said solenoid 80. From the latter a line 282 runs to said contact switch 208. A return line 284 connects with said return line 276. A circuit can be established by pressing said key button 154.

In operation, when the line delivery carriage lever 172 returns the carriage to starting position the operator presses lever key 154 which actuates control lever 156 thus moving switch lever 264 to closed position. This establishes an electrical circuit from switch 208 through said solenoid 80 and it draws said arm 82 inwardly which pivotally moves said bar 72 thus drawing said gear 68 into mesh with rotating gear 86. Rotation of said gear 68 by gear 86 draws said linecasting handle 20 downwardly through the lever means previously described. This rotates said shaft 22 thus actuating the elevator lifting mechanism as though said handle 20 had been depressed by hand.

What I claim is:

1. Apparatus to actuate the assembling elevator lifting mechanism of a linecasting machine, said apparatus comprising lever means adapted to operably connect with said lifting mechanism, actuating means operably connected to said lever means to actuate the latter embodying a driving gear and a driven gear, a motor having a shaft operably connected to said driving gear to rotate the latter when activated, said driven gear normally being spaced from said driving gear, a solenoid operably connected to said shaft, connecting means between said solenoid and said driven gear and which upon actuation of said solenoid moves said gear into mesh with said driving gear.

2. Apparatus as set forth in claim 1, a movable arm operably connected to said solenoid, a supporting bar pivotally connected to said movable arm and to said driven gear whereby electrification of said solenoid moves said arm and bar to thereby move said driven gear into mesh with said driving gear.

3. Apparatus to actuate the assembling elevator lifting mechanism of a linecasting machine, said apparatus comprising lever means to operably connect with said lifting mechanism, a mounting member for attachment to said machine, actuating means operably connected to said lever means to actuate the latter supported by said mounting member in position of use, electrical means operably connected to said instrumentalities to actuate the latter, and electrical circuit control means electrically connected to said electrical means and embodying a control lever to be actuated by an operator of said machine to thereby close an electrical circuit to thereby actuate said electrical means, and embodying a switch electrically connected to said electrical means having a switch lever, means connecting said switch lever to said control lever and which upon actuation closes said switch and establishes an electrical circuit through said electrical means, and embodying stop means operably connected to said control lever to stop actuation of said switch lever when said stop means is in a predetermined position and thereby prevent the establishment of said electrical circuit, said stop means embodying a pivot arm and a roller movably mounted thereon, said roller contacting a linecasting machine carriage lever at a predetermined point in the movement of the latter whereby said pivot arm is actuated to thereby move said stop means from stop position and permit actuation of said switch lever to thereby establish an electrical circuit.

4. Apparatus as set forth in claim 3, and a pivot arm operably connected to said roller and to said stop means and which, when said roller is actuated, moves said stop means from stop position.

References Cited by the Examiner
UNITED STATES PATENTS

| | | | |
|---|---|---|---|
| 2,770,355 | 11/1956 | Fine | 199—18 |
| 3,139,178 | 6/1964 | Krause et al. | 199—18 |

JEROME SCHNALL, *Primary Examiner.*

EUGENE R. CAPOSIO, *Examiner.*

NELSON M. ELLISON, *Assistant Examiner.*